United States Patent [19]
Handley

[11] Patent Number: 6,018,367
[45] Date of Patent: Jan. 25, 2000

[54] FRAME DISPLAY DILATION IN VIDEO DECODING

[75] Inventor: Maynard J. Handley, Cupertino, Calif.

[73] Assignee: Apple Computer, Inc., Cupertino, Calif.

[21] Appl. No.: 08/720,546

[22] Filed: Sep. 30, 1996

[51] Int. Cl.[7] ...................................................... H04N 5/76
[52] U.S. Cl. ......................... 348/415; 348/416; 348/412; 348/845.2; 348/845.3; 348/464; 348/500; 348/501; 348/700
[58] Field of Search ...................................... 348/415, 419, 348/384, 411, 412, 410, 409, 390, 699, 423, 845.2, 845.3, 715, 714, 416, 513, 500, 501

[56] References Cited

U.S. PATENT DOCUMENTS

| | | | |
|---|---|---|---|
| 5,253,054 | 10/1993 | Fujiwara et al. | 348/415 |
| 5,416,521 | 5/1995 | Chujoh et al. | 348/411 |
| 5,596,420 | 1/1997 | Daum | 348/515 |
| 5,621,464 | 4/1997 | Teo et al. | 348/423 |
| 5,668,601 | 9/1997 | Okada et al. | 348/423 |

Primary Examiner—Anand S. Rao
Attorney, Agent, or Firm—Edward W. Scott, IV

[57] ABSTRACT

A method and apparatus in a computer system for decoding and displaying video frames. An estimated number of intraframes which can be decoded in a current interframe run is determined. Based upon the estimated number of intraframes, determining an adjusted time interval in which to display each intraframe in the current interframe run. The intraframes are then displayed at the adjusted time interval in the current interframe run. The adjusted time interval may include equal time periods for displaying the estimated number of intraframes within the current interframe run. Discontinuities in display of moving video sequences can be avoided.

28 Claims, 4 Drawing Sheets

FRAME DISPLAY DILATION IN VIDEO DECODING

BACKGROUND OF THE INVENTION

1. Field of the Invention

The present invention relates to real-time decoding and displaying of motion picture images. More specifically, the present invention relates to displaying decoded video frames in intraframe runs at times other than they would normally be displayed.

2. Background

Decoding real-time moving video imagery on computer systems poses a number of challenges to designers. Due to the lack of computational power of some processing and display systems required to decode and display such imagery in real-time, compromises must be made in order that near real-time decode and display can be achieved. Such comprises include reductions in frame size, resolution, frame speed, and/or frame display.

Figure 1:
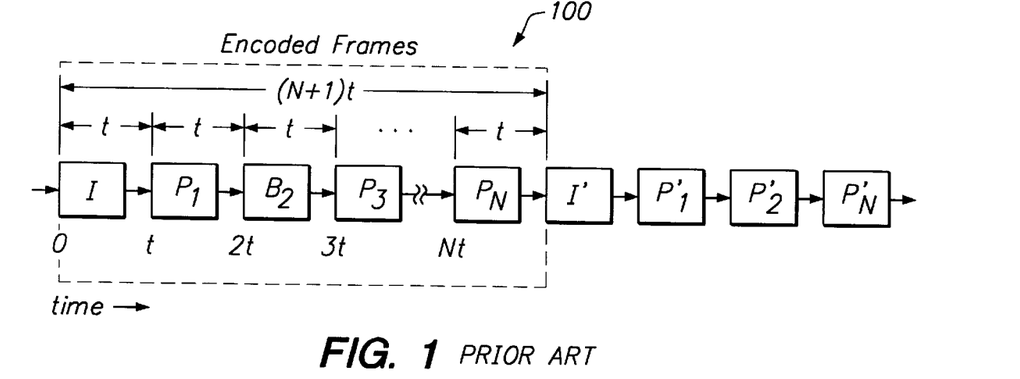
FIG. 1 illustrates a prior art sequence of encoded images.
Figure 2:
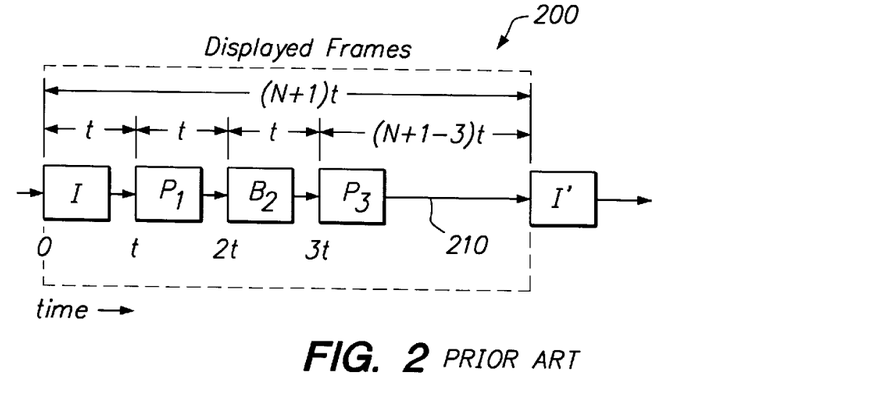
FIG. 2 shows a prior art display of a sequence of decoded images.

One prior approach to processing real-time video imagery is shown with reference to FIGS. 1 and 2. FIG. 1 illustrates a sequence of unprocessed or encoded frames, such as compressed frames, which is input to a video decoder, and the real-time periods at which each frame should be displayed. FIG. 2 illustrates the actual frames which are displayed after being processed in this manner, such as by a decoder, in one prior art implementation, and the times at which they are displayed.

For the purposes of this disclosure, each square in the figures represents a frame, and the notation I, P, or B refers to the type of frame. An I frame is known as a intraframe, or keyframe, and provides complete frame information. The data in each I frame is used to generate the data for the remainder of the frames, known as interframes, in each I-I, or intraframe, run (e.g. 100 of FIG. 1). It must be decoded. One type of interframe, the P frame, in the MPEG (Motion Pictures Experts Group) standard, refers to predicted frames, and contain prediction information from the preceding intraframe during the I-I run. A B frame, a bidirectionally-predicted interframe, uses both the preceding (I) and succeeding intraframe (I') in order to generate the decoded data for the B frame.

One prior art approach to frame decoding and display is shown in FIGS. 1 and 2. In these figures, it is assumed that the decoder does not have sufficient computational capacity to decode and display all of the frames N in real-time during the I-I run 100 shown in FIG. 1. Therefore, a compromise of frame rate or quality must be chosen. In the example of FIG. 2, frame rate is sacrificed. In this example, the I-I' run 100 shown in FIG. 1 comprises N frames which each should be displayed at equally-spaced intervals t. In this example, the decoder only has sufficient capacity to decode 3 interframes before it must start processing the next interframe I' which, as stated previously, must be decoded. During the interframe display period 200 shown in FIG. 2, therefore, the decoder displays only the frames $P_1$, $B_2$, and $P_3$. In this prior art implementation, which is not atypical, the decoded interframes are displayed at intervals of t, the desired playback rate as specified in the encoded sequence 100.

Even though the frames which are able to be decoded within the allotted time are displayed at the specified intervals, because only three interframes $P_1$, $B_2$, and $P_3$ are able to be decoded within the allotted time, there is a discontinuity of display between the display of the frames within the I-I' run 200 and the display of the following interframe I'. This discontinuity, a time period 210 of duration (N+1−3)t (the difference between the total number of frames N and the actual number of displayed frames three plus one multiplied by the interframe display period t) results in a freeze in the real-time display of the imagery until the display of the following interframe I'. This freeze of the last frame $P_3$ and discontinuity 210 is readily discernible and is visually disturbing to a viewer of the displayed sequence.

Thus, improved methods/apparatus for displaying moving video imagery, such as in such as in intraframe or I-I runs, are required.

SUMMARY

A method and apparatus in a computer system for decoding and displaying video frames. An estimated number of interframes which can be decoded in a current intraframe run is determined. Based upon the estimated number of interframes, determining an adjusted time interval in which to display each interframe in the current intraframe run. The interframes are then displayed at the adjusted time interval in the current intraframe run. The adjusted time interval may include equal time periods for displaying the estimated number of interframes within the current intraframe run.

Determining an estimated number of interframes which can be decoded in the current intraframe run includes determining whether all of the interframes from a previous intraframe run were processed. If not, it includes determining whether any time remained in the previous intraframe run for decoding additional interframes. The estimated number of intraframes for the current intraframe run is increased if the time remained in the previous intraframe run.

Determining whether the adjusted time interval in which to display each the interframe in the current intraframe run includes determining a period for the current intraframe run and then determining the adjusted time interval by dividing the period by the estimated number of interframes which can be decoded in the current intraframe run.

The step of decoding the estimated number of interframes in the current interframe run includes priority decoding of predicted (P) frames followed by bidirectionally predicted (B) frames in the intraframe run until all of the interframes in the intraframe run have been decoded.

BRIEF DESCRIPTION OF THE DRAWINGS

The present invention is illustrated by way of example and not limitation in the figures of the accompanying in which like references indicate similar elements and in which.

DETAILED DESCRIPTION

The present invention relates to the decoding and display of images in real-time. This decoding may take place in a variety of environments, including, programmed computer systems or devices, or dedicated devices for such decoding. Although the present invention will be described with reference to certain specific embodiments thereof, especially, with relation to certain hardware configurations, bit lengths, encoding methods and formats, method steps, and other specific details, these should not be viewed as limiting the present invention. Various modifications and other changes may be made by one skilled in the art, without departing from the overall spirit and scope of the present invention.

A portion of the disclosure of this patent document may contain material which is subject to copyright protection. They copyright owner has no objection to the facsimile reproduction by anyone of the patent disclosure, as it appears in the Patent and Trademark Office patent files or records, but otherwise reserves all copyright rights whatsoever. Copyright® Apple Computer, Inc.

Figure 3:
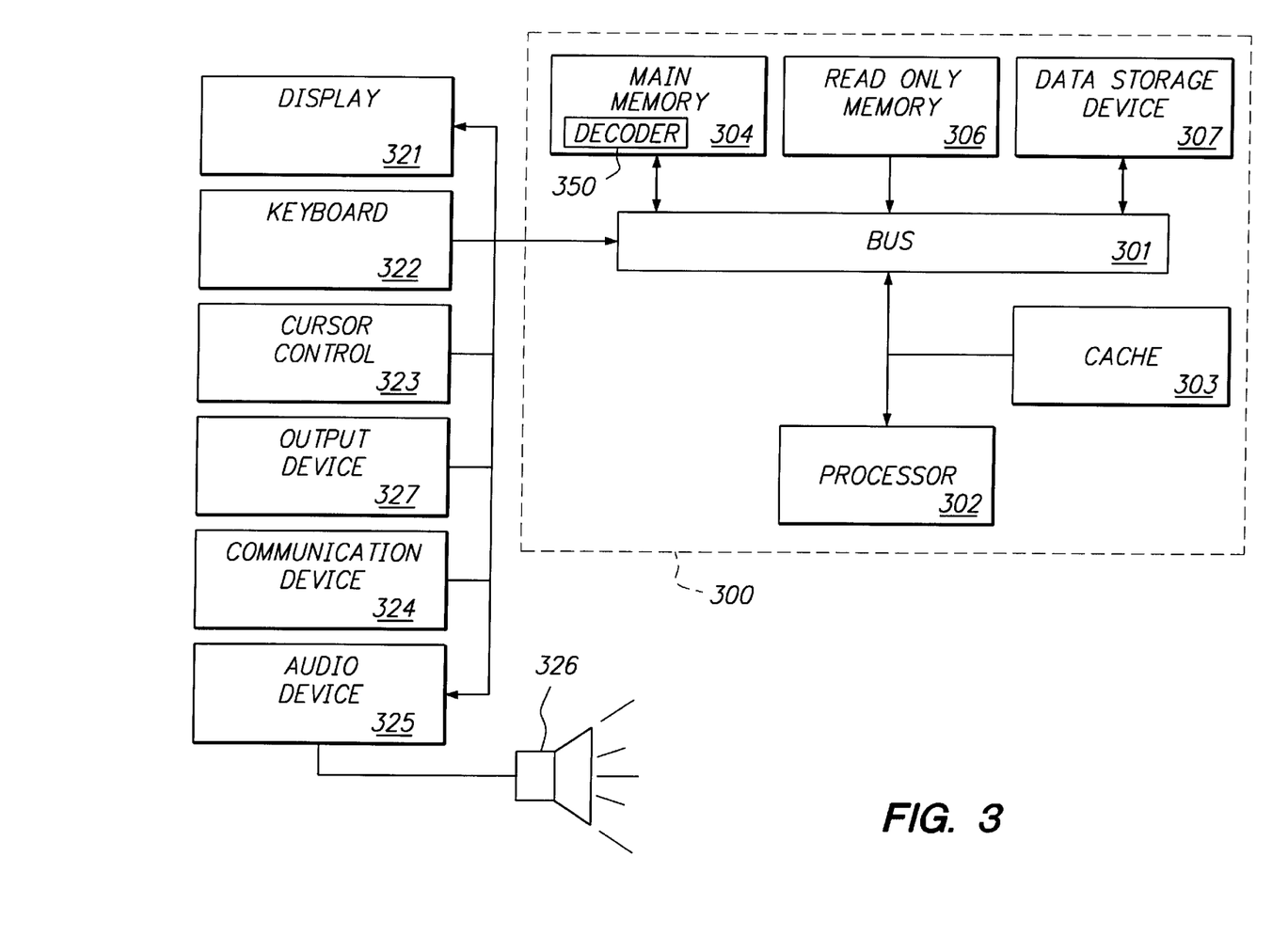
FIG. 3 shows a system for image decoding and display.

A typical system configuration in which embodiments of the present invention may be implemented is shown in FIG. 3. In various embodiments of the present invention, a general purpose computer system is used for implementing the methods and mechanisms to be described here. A computer system, such as a workstation, personal computer or other processing apparatus 300 is illustrated in more detail in FIG. 3. 300 comprises a bus or other communication means 301 for communicating information, and a processor 302 coupled with bus 301 for processing information. System 300 further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302 during run-time. System 300 also comprises a read only memory (ROM) and/or other static storage device 306 coupled to bus 301 for storing static information and instructions for processor 302, and a data storage device 307 such as a magnetic disk or optical disk and its corresponding disk drive. Data storage device 307 is coupled to bus 301 for storing information and instructions.

System 300 may further be coupled to a display device adapter 321 such as a cathode ray tube (CRT) or liquid crystal display (LCD) coupled to bus 301 for displaying information to a computer user. Such a display 321 may further be coupled to bus 301 for the receipt of video or image information. An alphanumeric input device 322, including alphanumeric and other keys may also be coupled to bus 301 for communicating information and command selections to processor 302. An additional user input device is cursor control 323, such as a mouse, a trackball, stylus, or cursor direction keys, coupled to bus 301 for communicating direction information and command selections to processor 302, and for controlling cursor movement on display 321. A hard copy output device 327 can also be coupled to bus 301 for generating hard copy information.

System 300 may also include a communication device 324 which is useful for communicating with networks and/or other systems. For example, this may include a network adapter which is configured to receive signals over a computer network. System 300 may also include an audio device 335 for the output of audio information to a transducer such as a speaker 326.

Main memory 304 of system 300 may include therein an executable program or module 350 for decoding of information within system 300. This may include an audio and/or video decoder (e.g. an MPEG decoder). This module includes executable instructions which are retrieved from main memory 304 and executed by processor 302. Instructions and other information may be cached in a cache 303 coupled to processor 302, including instructions of and/or data used by decode module 350. Cache 303 may be internal to processor 302 (e.g. an L1 cache) and/or external to processor 302 (an L2 cache) according to different implementations.

Note, also, that any or all of the components of system 300 and associated hardware may be used in various embodiments, however, it can be appreciated that any configuration of the system may be used for various purposes according to the particular implementation.

In one embodiment, system 300 is one of the Apple® brand computer family of personal computers such as the Power Macintosh® 8100 brand personal computer manufactured by Apple Computer, Inc. of Cupertino, Calif. (trademarks of Apple Computer, Inc.). Processor 302 may be one of the PowerPC™ (trademark of International Business Machines Corporation) brand microprocessors.

Note that the following discussion of various embodiments discussed herein will refer specifically to a series of routines which are generated in a high-level programming language (e.g., the C++ programming language) and compiled, linked, and then run as object code in system 300 during run-time within main memory 304 by processor 302.

Although a general purpose computer system has been described, it can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 4:
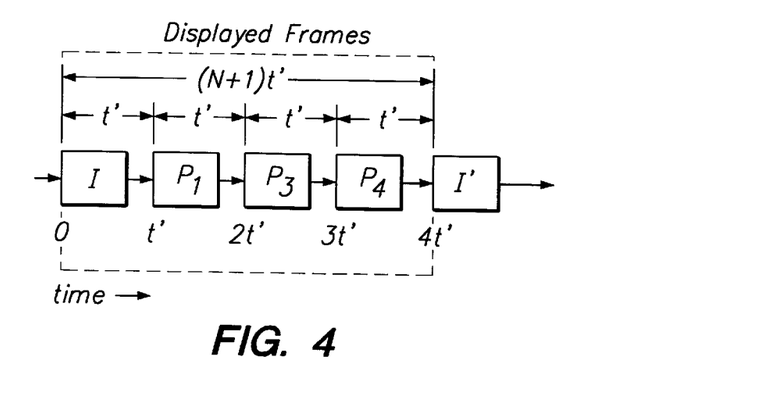
FIG. 4 shows the display of decoded images in embodiments of the present invention.

FIG. 4 shows a sequence of display of the images which have been decoded from the bitstream shown in FIG. 1 in implemented embodiments of the present invention. Two distinctions between the prior art display 200 shown in FIG. 2 of the intraframe sequence 100 should be noted. First, even though not all of the frames in the sequence have been decoded, as in the prior art, only P frames ($P_1$, $P_2$, and $P_4$) have been displayed. Second, the interframes which are decoded and displayed are actually displayed at equally-spaced time intervals within the intraframe run between I and I'. Thus, the times at which the frames are displayed have been skewed, or dilated. Instead of equally-spaced intervals t for which each of the interframes should be displayed with reference to only the first intraframe I, the frames which are decoded and displayed in embodiments of the present invention are displayed at adjusted equally-spaced intervals t' within the intraframe run between both I and I'. Thus, even though all of the interframes are displayed at times other than they should be displayed, there are no extended time periods or discontinuities in display of the frames. There are no freezes of a single frame for any extended period of time. Because there are no discontinuities in display, a playback of frames is smooth and continuous, and the lack of decoding and display of all frames in the encoded sequence is less readily apparent to a viewer of the moving picture sequence.

As in typical prior art methods, frames may be buffered in the decoding system, and processed individually. In this embodiment, each frame is processed using a Handle New Frame process such as 500 illustrated in FIG. 5.

Figure 5:
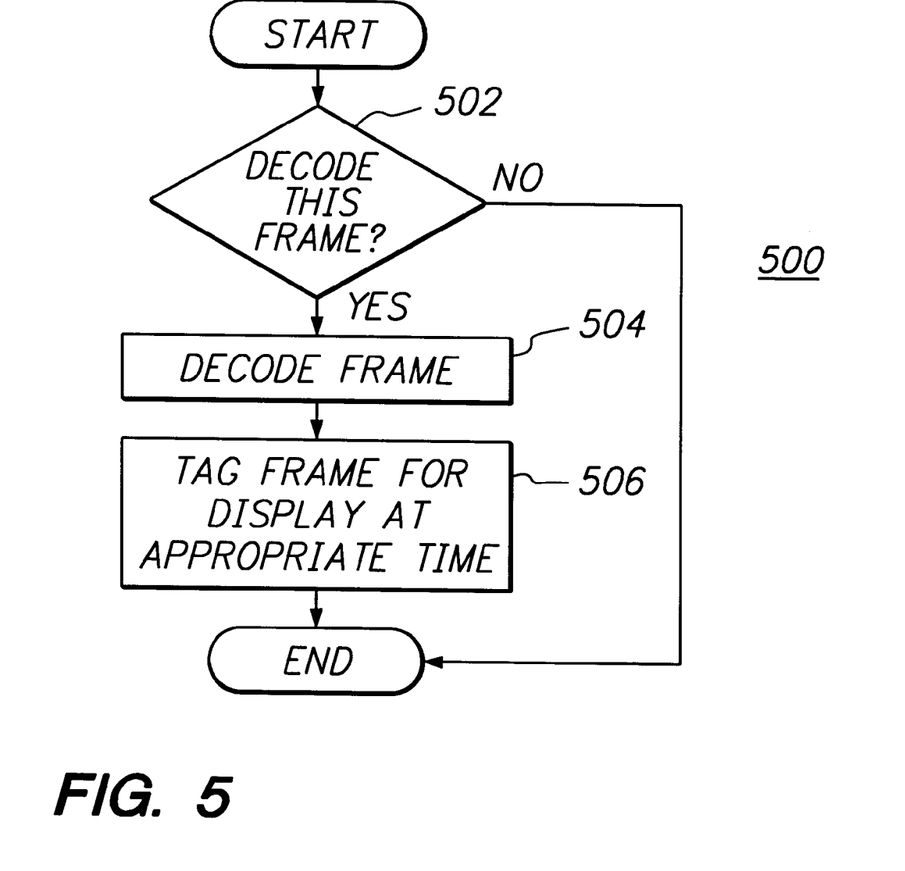
FIG. 5 shows a method for processing an input frame during decode.

FIG. 5 illustrates the overall method 500 for handling frames within a decoder in implemented embodiments of the present invention. The process starts processing each frame by determining whether the frame should be decoded or not at step 502. If not, the process exits. It may be called again when a new frame is desired to be processed. If the frame should be decoded, then it is decoded at step 504. This can be done using any number of techniques, including MPEG, MPEG 2 or any of a number of proprietary video encoding algorithms. Subsequent to the decoding of the frame at step 504, the frame is tagged with a time for display at step 506. This time may be a real-time value and is a function of the index of the interframe in the intraframe run and a step value (such as t'), which indicates the interval between the display of each interframe in the run. A real-time clock mechanism which triggers an interrupt when the frame tag time is reached and which may invoke an interrupt handler to display the frame can be used for the actual display of the frame at the appropriate interval. Because such an mechanism is relatively straightforward, it has been omitted for the purposes of simplicity of this disclosure. Other techniques which cause display of the decoded frame at the frame tag time may also be used.

Figure 6:
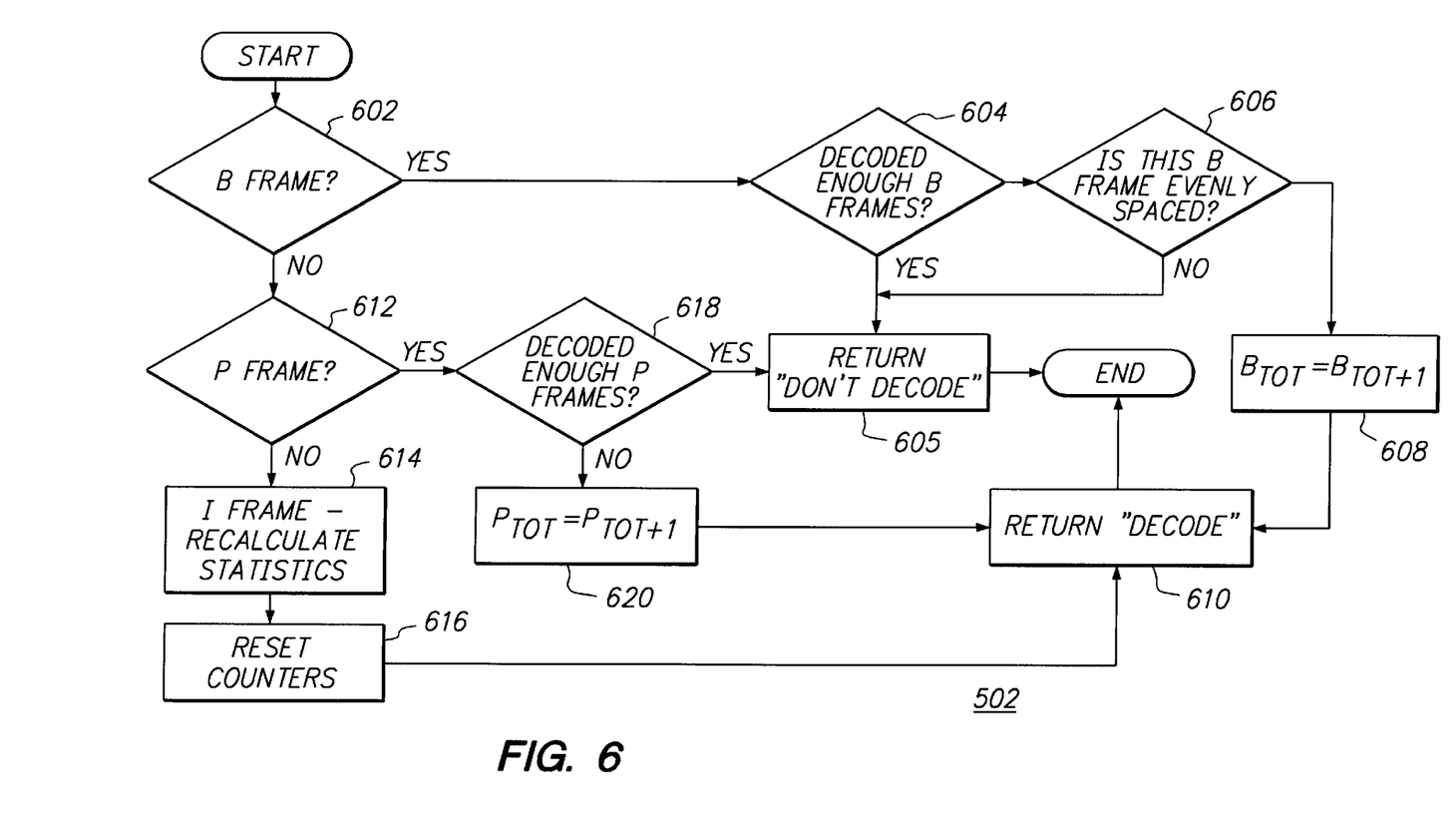
FIG. 6 shows a method for determining whether an input frame should be decoded during processing.

FIG. 6 illustrates the method 502 for determining whether a particular frame should be decoded. The method starts at step 602 by determining whether the current frame is a B frame. B frames have the least priority in the decoding process. If so, then, at step 604, it is determined whether enough B frames have been decoded during this intraframe (I-I) run. In embodiments of the present invention, counters are maintained for each interframe type (P and B), and statistics are retained about how many frames of each type can and should be decoded for each intraframe run. Thus, process 502 determines, at step 604, whether enough B frames have been decoded for this run by comparing the counter against the maximum number of B frames which should be decoded. If sufficient B frames have already been decoded, then the process returns a flag at step 605 indicating that the frame should not be decoded during this run.

If step 604 determines that enough B frames have not been decoded for this run, then this B frame is a candidate for decode. One additional criteria is applied in this embodiment to the B frame before a decision that it should be decoded should be made. It is determined at step 606 if the B frame is evenly spaced in the intraframe run. For example, if several B's are present in the run, and fewer will be decoded and displayed that are in the encoded stream, in order to prevent other perceptible discontinuities in the sequence, the B frames that are decoded are evenly spaced throughout the run. This can be done in any number of manners according to the total number of interframes to be displayed, the number of B frames to be displayed, etc . . . If the B frame being tested is evenly spaced in the run, then the counter $B_{tot}$ is incremented at step 608, and a flag is returned at step 610 indicating that the frame should be decoded.

If step 602 determines that the frame is not a B frame, then it is determined whether it is a P frame at step 612. If so then, at step 618, it is determined, by reference to the P frame counter for the intraframe run whether enough P frames have been decoded. If so then, at step 605, the process returns with a flag indicating that the frame should not be decoded. If not, then the P frame counter $P_{tot}$ is incremented at step 620, and the process rectums at step 610 with an indication that the frame should be decoded.

If step 612 determines that the frame is not a P frame, then the frame is an I frame. In this instance, at step 614, the statistics about the current intraframe run are recalculated. This is done to determine how many interframes of the various types that the decoder can budget for decoding and display during an intraframe run. Because intraframe runs are frequently similar within an encoded sequence, statistics about how the decoder is doing from run to run can be used for processing of the next run. Because the decoder knows by these statistics how many frames will be decoded in the current run, the times for display of the decoded frames can also be determined which is equally spaced within each run. This approach is much more sophisticated and robust than an approach such as described in the prior art which simply decodes interframes and displays them at the time specified in the encoded sequence until time runs out and the following intraframe must be decoded. Using this approach, interframes in a current intraframe run can be processed and displayed at equal intervals without any discontinuities or "freeze" frames in the display of the moving sequence. Thus, abnormalities in the display of the moving sequence are avoided. Subsequent to the recalculation of the intraframe run statistics, the counters for the interframe types are reset at step 616 and the process returns with a flag indicating that the frame should be decoded (it must—it is an intraframe).

For the purposes of each intraframe run, maximum values, such as $P_{max}$ and $B_{max}$, are maintained which indicate the maximum number of interframes of each type which should be decoded for the present run. P frames are have priority of decode over B frames, thus, if all of the P frames for a run are not decoded, then no B frames will be. Upon initialization of the decoder, the maximum values may be initialized to some known value, or zero, according to implementation. Upon re-calculation of each intraframe run's statistics, the interframe maximum values for both P and B frames can be increased by some incremental amount if time remained in the previous intraframe run. This can continue until some optimum maximum values are arrived at for both P and B frames.

Thus, by use of the foregoing, improved appearance of real-time moving decoded video images, such as compressed video images decoded on a computer system and presented on a display, can be achieved by use of the foregoing methods. It will be appreciated that though the foregoing has been described especially with reference to FIGS. 1–6, that many modifications made be made, by one skilled in the art, without departing from the scope of the invention as described here. The invention is thus to be viewed as limited only by the appended claims which follow.

What is claimed is:

1. An automatic method for displaying image data comprising the following steps:

a. prior to displaying interframes in an intraframe run, determining an estimated number of the interframes which can be decoded in the intraframe run, wherein the estimated number of interframes is less than the number of interframes in the intraframe run;

b. based upon the estimated number of interframes, determining an adjusted time interval in which to display each of the estimated number of interframes in the intraframe run;

c. displaying each of the estimated number of the interframes at the adjusted time interval in the intraframe run.

2. The method of claim 1 wherein the step of determining an estimated number of interframes which can be decoded in the intraframe run includes:

a. determining whether all of the interframes from a previous intraframe run were processed, and if not, determining whether any time remained in the previous intraframe run for decoding additional interframes; and b. increasing the estimated number of interframes for the intraframe run if the time remained in the previous intraframe run.

3. The method of claim 1 wherein the step of determining the adjusted time interval in which to display each interframe in the intraframe run includes:
   a. determining a period for the intraframe run;
   b. determining the adjusted time interval by dividing the period by the estimated number of interframes which can be decoded in the intraframe run.

4. The method of claim 1 wherein the step of decoding the estimated number of interframes in the interframe run includes priority decoding of predicted (P) frames followed by bidirectionally predicted (B) frames in the intraframe run until all of the interframes in the intraframe run have been decoded.

5. The method of claim 1 wherein the adjusted time interval includes equal time periods for displaying the estimated number of interframes within the intraframe run.

6. An apparatus for displaying image data comprising:
   a. means operative prior to displaying interframes in an intraframe run for determining an estimated number of the interframes which can be decoded in the intraframe run, wherein the estimated number of interframes is less than the number of interframes in the intraframe run;
   b. means for determining an adjusted time interval in which to display each of the estimated number of interframes in the intraframe run coupled to the means for determining an estimated number of interframes which can be decoded;
   c. means for displaying each of the estimated number of interframes at the adjusted time interval in the intraframe run coupled to the means for determining an adjusted time interval in which to display each of the estimated number of interframes.

7. The apparatus of claim 6 wherein the means for determining an estimated number of interframes which can be decoded in the intraframe run includes:
   a. means for determining whether all of the interframes from a previous intraframe run were processed, and if not, determining whether any time remained in the previous intraframe run for decoding additional interframes; and
   b. means for increasing the estimated number of intraframes for the intraframe run if the time remained in the previous intraframe run.

8. The apparatus of claim 6 wherein the means for determining the adjusted time interval in which to display each the interframe in the intraframe run includes:
   a. means for determining a period for the intraframe run;
   b. means for determining the adjusted time interval by dividing the period by the estimated number of interframes which can be decoded in the intraframe run.

9. The apparatus of claim 6 wherein the means for decoding the estimated number of interframes in the interframe run includes a means for priority decoding of predicted (P) frames followed by bidirectionally predicted (B) frames in the intraframe run until all of the interframes in the intraframe run have been decoded.

10. The apparatus of claim 6 wherein the adjusted time interval includes equal time periods for displaying the estimated number of interframes within the intraframe run.

11. An automatic method for processing image data comprising the following steps:
    a. prior to displaying interframes in an intraframe run, determining an estimated number of the interframes which can be decoded in the intraframe run, wherein the estimated number of interframes is less than a number of interframes in the intraframe run;
    b. based upon the estimated number of interframes, determining an adjusted time interval between which each of the estimated number of interframes in the intraframe run should be displayed;
    c. tagging each of the estimated number of interframes to each be displayed at the adjusted time interval in the intraframe run.

12. The method of claim 11 wherein the step of determining an estimated number of interframes which can be decoded in the intraframe run includes:
    a. determining whether all of the interframes from a previous intraframe run were processed, and if not, determining whether any time remained in the previous intraframe run for decoding additional interframes; and
    b. increasing the estimated number of intraframes for the intraframe run if the time remained in the previous intraframe run.

13. The method of claim 11 wherein the step of determining the adjusted time interval in which to display each the interframe in the intraframe run includes:
    a. determining a period for the intraframe run;
    b. determining the adjusted time interval by dividing the period by the estimated number of interframes which can be decoded in the intraframe run.

14. The method of claim 11 wherein the step of decoding the estimated number of interframes in the interframe run includes priority decoding of predicted (P) frames followed by bidirectionally predicted (B) frames in the intraframe run until all of the interframes in the intraframe run have been decoded.

15. The method of claim 11 wherein the adjusted time interval includes equal time periods for displaying the estimated number of interframes within the intraframe run.

16. The method of claim 11 wherein the adjusted time interval is longer than a specified display time interval for each of the number of interframes in the intraframe run.

17. An apparatus for processing image data comprising:
    a. means operative prior to displaying interframes in an intraframe run, for determining an estimated number of the interframes which can be decoded in the intraframe run, wherein the estimated number of interframes is less than a number of interframes in the intraframe run;
    b. means for determining an adjusted time interval in which to display each interframe in the intraframe coupled to the means for determining an estimated number of interframes which can be decoded based upon the estimated number of interframes;
    c. means for tagging each of the estimated number of interframes to each be displayed at the adjusted time interval in the intraframe run coupled to the means for determining an adjusted time interval.

18. The apparatus of claim 17 wherein the means for determining an estimated number of interframes which can be decoded in the intraframe run includes:
    a. means for determining whether all of the interframes from a previous intraframe run were processed, and if not, determining whether any time remained in the previous intraframe run for decoding additional interframes; and
    b. means for increasing the estimated number of intraframes for the intraframe run if the time remained in the previous intraframe run coupled to the means for determining whether all of the interframes from a previous intraframe run were processed.

19. The apparatus of claim 17 wherein the means for determining the adjusted time interval in which to display each the interframe in the intraframe run includes:
   a. means for determining a period for the intraframe run;
   b. means for determining the adjusted time interval by dividing the period by the estimated number of interframes which can be decoded in the intraframe run coupled to the means for determining the period.

20. The apparatus of claim 17 wherein the means for decoding the estimated number of interframes in the interframe run includes a means for priority decoding of predicted (P) frames followed by bidirectionally predicted (B) frames in the intraframe run until all of the interframes in the intraframe run have been decoded.

21. The apparatus of claim 17 wherein the adjusted time interval includes equal time periods for displaying the estimated number of interframes within the intraframe run.

22. The apparatus of claim 17 wherein the adjusted time interval is longer than a specified display time interval for each of the number of interframes in the intraframe run.

23. A computer readable medium encoded with instructions which, when executed, cause a computer to perform a method for processing image data comprising the following steps:
   a. prior to displaying interframes in an intraframe run, determining an estimated number of the interframes which can be decoded in the intraframe run, wherein the estimated number of interframes is less than a number of interframes in the intraframe run;
   b. based upon the estimated number of interframes, determining an adjusted time interval between which each of the estimated number of interframes in the intraframe run should be displayed;
   c. tagging each of the estimated number of interframes to each be displayed at the adjusted time interval in the intraframe run.

24. The computer readable medium of claim 23 wherein the step of determining an estimated number of interframes which can be decoded in the intraframe run includes:
   a. determining whether all of the interframes from a previous intraframe run were processed, and if not, determining whether any time remained in the previous intraframe run for decoding additional interframes; and
   b. increasing the estimated number of intraframes for the intraframe run if the time remained in the previous intraframe run.

25. The computer readable medium of claim 23 wherein the step of determining the adjusted time interval in which to display each the interframe in the intraframe run includes:
   a. determining a period for the intraframe run;
   b. determining the adjusted time interval by dividing the period by the estimated number of interframes which can be decoded in the intraframe run.

26. The computer readable medium of claim 23 wherein the step of decoding the estimated number of interframes in the interframe run includes priority decoding of predicted (P) frames followed by bidirectionally predicted (B) frames in the intraframe run until all of the interframes in the intraframe run have been decoded.

27. The computer readable medium of claim 23 wherein the adjusted time interval includes equal time periods for displaying the estimated number of interframes within the intraframe run.

28. The computer readable medium of claim 23 wherein the adjusted time interval is longer than a specified display time interval for each of the number of interframes in the intraframe run.

* * * * *

UNITED STATES PATENT AND TRADEMARK OFFICE
CERTIFICATE OF CORRECTION

PATENT NO.     : 6,018,367
DATED          : January 25, 2000
INVENTOR(S)    : Maynard J. Handley It is certified that error appears in the above-identified patent and that said Letters Patent is hereby corrected as shown below:

Title page,
Item [57], ABSTRACT,
Line 3, replace "intraframes" with -- interframes --
Lines 3-4, replace "interframe run" with -- intraframe run --
Line 5, replace "intraframes" with -- interframes --
Line 6, replace "intraframe" with -- interframe --
Line 6, replace "interframe run" with -- intraframe run --
Line 7, replace "intraframes" with -- interframes --
Line 8, replace "interframe run" with -- intraframe run --
Line 10, replace "intraframes" with -- interframes --
Line 10, replace "interframe run" with -- intraframe run --

Column 1,
Line 55, replace "interframe I'" with -- intraframe I' --

Column 2,
Line 1, replace "interframe I'" with -- intraframe I' --
Line 6, replace "interframe I'" with -- ntraframe I' --
Line 32, replace "intraframes'" with -- interframes --
Line 35, replace "each the interframe" with -- each interframe --
Line 41, replace "interframe run" with -- intraframe run --

Column 7,
Line 12, replace "interframe run" with -- intraframe run --
Line 50, replace "each the interframe" with -- each interframe --
Lines 56-57, replace "interframe run" with -- intraframe run --

Column 8,
Line 24, replace "each the interframe" with -- each interframe --
Line 30, replace "interframe run" with -- intraframe run --
Line 66, replace "intraframes" with -- interframes --

Column 9,
Line 5, replace "each the interframe" with -- each interframe --
Lines 12-13, replace "interframe run" with -- intraframe run --

UNITED STATES PATENT AND TRADEMARK OFFICE
CERTIFICATE OF CORRECTION

PATENT NO. : 6,018,367
DATED : January 25, 2000
INVENTOR(S) : Maynard J. Handley It is certified that error appears in the above-identified patent and that said Letters Patent is hereby corrected as shown below:

Column 10,
Line 11, replace "intraframes'" with -- interframes --
Line 16, replace "each the interframe" with -- each interframe --
Line 23, replace "interframe run" with -- intraframe run --

Signed and Sealed this

Twenty-ninth Day of October, 2002

*Attest:*

*Attesting Officer*

JAMES E. ROGAN
*Director of the United States Patent and Trademark Office*